Oct. 1, 1940.   F. J. SVOBODA   2,216,302

PIPE PERFORATING DEVICE

Filed May 2, 1938

Frank J. Svoboda
INVENTOR.

BY *[signature]*
ATTORNEYS.

Patented Oct. 1, 1940

2,216,302

UNITED STATES PATENT OFFICE 2,216,302

PIPE PERFORATING DEVICE

Frank J. Svoboda, Verdigre, Nebr., assignor to The Griswold Manufacturing Company, Erie, Pa., a corporation of Pennsylvania Application May 2, 1938, Serial No. 205,589

5 Claims. (Cl. 164—108)

This invention is designed to facilitate the perforating of pipes, particularly stove pipes. The perforations are provided to receive a damper rod. It is desirable that the damper rod be centered with relation to the pipe; that it shall also be in a plane at right angles to the axis of the pipe; and that it may be spaced along the pipe as desired. These results may be accomplished with the present invention. It is also desirable to locate the perforations with relation to the ordinary seam that is found on stove pipes and the present invention accomplishes this. Features and details of the invention will appear from the specification and claims.

Figure 1:
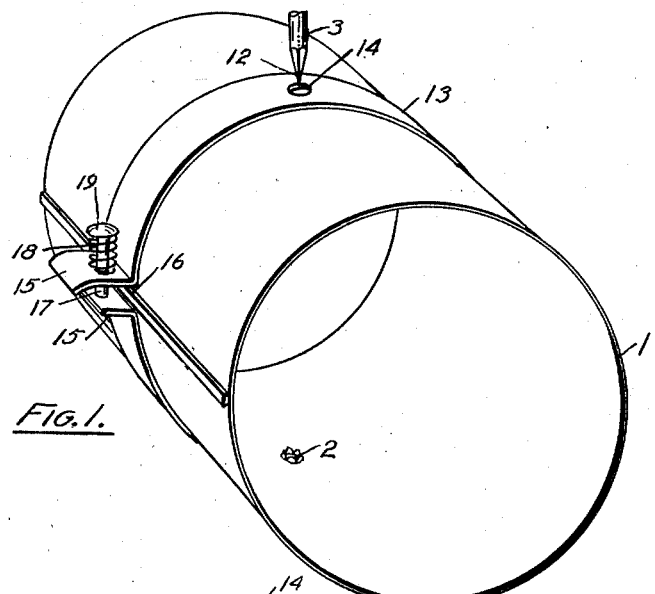

A preferred embodiment of the invention is illustrated in the accompanying drawing as follows:

Fig. 1 shows a perspective view of a section of pipe with the device in place thereon.

Figure 2:
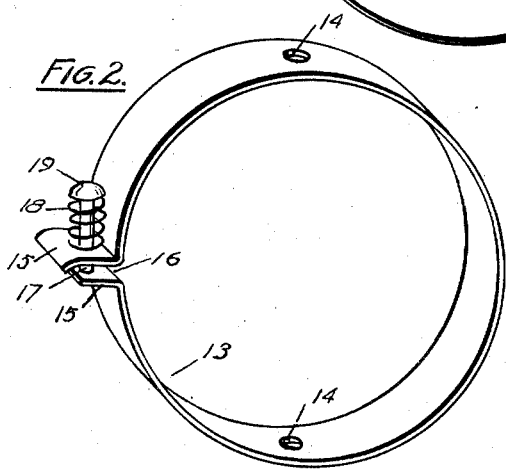

Fig. 2 a perspective view of the device detached.

Figure 3:
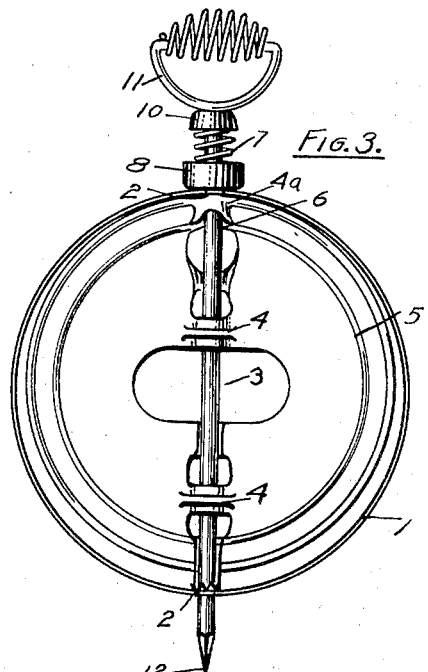

Fig. 3 a plan view of the pipe with the damper in place.

1 marks the pipe; 2 the perforations which are formed in the pipe. Preferably these perforations are so formed that the burr is extended into the pipe. Perforations are adapted to receive a damper rod 3. The damper rod extends through loops 4 and 4a in the damper plate 5. The loop 4a is notched to receive a shoulder 6 in order that the rod may be locked with the plate. A spring 7 is arranged around the rod between the cups 8 and 10 seated on the pipe and handle 11 respectively. The spring yieldingly holds the shoulder 6 in the notch loop. These parts are, or may be, of common construction.

The perforating device is made up of a band 13 adapted to encircle the pipe and a sufficient width to substantially square the band with relation to the pipe when in place. The band 13 has oppositely placed guide openings 14. The ends of the band are separated at 16 and provided with perforated ears 15. A pin 17 extends through the perforations in the ears and a spring 18 is arranged between one of the ears and a head 19 on the pin. The spring is tensioned to draw the ears together and consequently contract the band.

In use the band is placed on the pipe at the desired position of the damper. The space formed by the separation of the ends at 16 locates the band with relation to the fold in the pipe so as to place the perforations 14 at equal distances from the fold. The band places the openings in a plane substantially at right angles to the axis of the pipe and also in position to center the openings with relation to the pipe. With the band in place and using the openings as a guide, the rod 3 may be used for perforating the pipe. This assures a properly placed set of holes, places the burr inside the pipe inasmuch as each opening is formed from the outside and thus assures a smooth working damper.

What I claim as new is:

1. A perforating device comprising a band adapted to encircle a pipe having oppositely disposed guide openings said openings centering on the center of an inserted pipe, said openings and the space outwardly from and in radial alignment with the openings being normally unobstructed adapted to slidingly receive and position a perforating rod for punching openings in a pipe in opposite centered relation.

2. A perforating device comprising a band adapted to encircle a pipe having oppositely disposed and unobstructed guide openings adapted to receive and position a perforating rod, said band being open at one point to receive a pipe fold.

3. A perforating device comprising a band adapted to encircle a pipe having oppositely disposed and unobstructed guide openings adapted to receive and position a perforating rod; and a spring yieldingly closing the band.

4. A pipe perforating device comprising a band having separated ears at its ends; a pin secured to one ear and extending through the other ear; a spring on the pin adapted to contract the band, said band having oppositely disposed and unobstructed guide openings for receiving a perforating rod.

5. A perforating device comprising a band adapted to encircle a pipe having oppositely disposed and unobstructed guide openings adapted to receive and position a perforating rod and a perforating rod.

FRANK J. SVOBODA.